United States Patent [19]

Henshaw et al.

[11] 4,133,785

[45] Jan. 9, 1979

[54] PROCESS FOR PREPARING A FILM-FORMING MATERIAL

[75] Inventors: Bruce C. Henshaw, Mount Waverley; Frederick J. Lubbock, Beaumaris, both of Australia

[73] Assignee: Dulux Australia Ltd., Melbourne, Australia

[21] Appl. No.: 542,019

[22] Filed: Jan. 17, 1975

[30] Foreign Application Priority Data

Feb. 1, 1974 [AU] Australia .............................. 6440/74

[51] Int. Cl.$^2$ ............................................. C08L 91/00
[52] U.S. Cl. .............................. 260/22 CB; 260/23 P; 260/23 EM; 260/862; 428/458
[58] Field of Search ............ 260/23 EM, 23.7 R, 862, 260/22 CB, 23 P

[56] References Cited

U.S. PATENT DOCUMENTS

| | | | |
|---|---|---|---|
| 2,507,688 | 5/1950 | Armstrong | 260/23 |
| 3,457,207 | 7/1969 | Gorke | 260/23.7 R |
| 3,786,010 | 1/1974 | Tsugukuni et al. | 260/22 CB |
| 3,810,855 | 5/1974 | Tsugukuni et al. | 260/22 CB |
| 3,875,091 | 4/1975 | Tsugukuni | 260/23 EM |

OTHER PUBLICATIONS

Watt et al. – Chemistry (Norton) (N.Y.) (1964), p. 237.

Primary Examiner—Melvyn I. Marquis
Attorney, Agent, or Firm—Cushman, Darby & Cushman

[57] ABSTRACT

A process for preparing a film-forming material by reacting at least two α, β-ethylenically unsaturated monomers one of which is acrylonitrile with a drying or semi-drying oil-modified alkyd resin comprising 1% – 4% itaconic acid and then cooling the reaction mixture rapidly such that a dispersion of polymer particles of maximum diameter 2 micron is formed. The film-forming materials thus prepared are useful as constituents of fast-drying automotive refinish enamels.

3 Claims, No Drawings

PROCESS FOR PREPARING A FILM-FORMING MATERIAL

This invention relates to enamels which air-dry rapidly and more particularly to polymeric film-forming materials for use in such enamels.

The economics of industrial painting processes, notably the finishing or refinishing of automobiles, dictate that the paint compositions used therein should dry as quickly as possible after application to a substrate. The attainment of fast air-dry is in itself no problem but automotive finishes in particular are required to have other desirable properties such as high gloss, good gloss retention, good application properties and high storage stability, and in many cases the facility of fast drying is achieved to the detriment of one or more of these properties. For example, fast-drying enamels currently in use exhibit most of these desirable properties but many are prone to wrinkling, especially when applied in hot or humid conditions. Large wrinkles are an objectionable defect which mar the appearance of a paint film, whereas fine wrinkles, even if not individually visible, can lead to a considerable reduction in gloss. Other fast-drying enamels give films which exhibit a "shallow" gloss which is another undesirable feature in a refinish enamel. The formulation of an acceptable fast-drying enamel therefore demands that a compromise be reached between the speed of dry and other desirable properties, and this compromise cannot be circumvented so long as the currently available film-forming materials continue to be used in enamels.

We have now found that it is possible to prepare a liquid film-forming material which may be formulated into an enamel with very fast air-dry but without seriously compromising the other abovementioned desirable properties. We now provide a process of preparing a liquid film-forming material suitable for use in a fast-drying enamel by the stages of:

(a) adding a mixture of at least two copolymerisable α, β-ethylenically unsaturated monomers at least 10–19% by weight of which mixture is acrylonitrile, to a solution of a 60–70% oil length drying or semi-drying oil modified alkyd resin comprising 1.0 – 4.0% by weight of itaconic acid in a first hydrocarbon liquid of aniline point 35° – 45° C, at a concentration such that the monomer mixture comprises 35 – 55% of the total weight of the monomers and alkyd resin, and then reacting the monomers with the alkyd resin at 100° – 135° C in the presence of a free radical polymerisation initiator which is not a peroxide or a hydroperoxide; and (b) at the completion of reaction, diluting the reaction mixture with a second hydrocarbon liquid until the final aniline point of the resulting hydrocarbon liquid mixture in which the reaction product is dissolved is 40° – 50° C; and then (c) cooling the mixture at such a rate that there is formed a stable dispersion of polymer particles of size 2 micron maximum.

We have found that strict adherence to the limits and conditions of this process makes possible the production of an enamel which is better to a surprising extent than enamels of apparently similar composition known to the art.

The sole restriction on the choice of the first hydrocarbon liquid is that it should have an aniline point of 35° – 45° C. The aniline point of a hydrocarbon liquid may be defined as the minimum equilibrium solution temperature for equal volumes of aniline and the hydrocarbon liquid; it is a useful and accurate way of defining the quantity of aromatic hydrocarbons present in a hydrocarbon liquid and it may be determined according to the method of Standard D1012-62 of the American Society for Testing and Materials. The aniline point of the first hydrocarbon liquid is critical to our process. It appears that the alkyd resin must be soluble in the first hydrocarbon liquid and remain thus until the dilution with the second hydrocarbon liquid; we have found that hydrocarbon liquids with aniline points within our chosen range satisfy this condition.

Other considerations which have a bearing on the choice of our preferred aniline point range for the first hydrocarbon liquid are the desired weight solids content of the final film-forming material and the required final aniline point of the hydrocarbon liquid mixture. We have found that for best results the final aniline point of the hydrocarbon liquid mixture should be from 40° – 50° C; the first hydrocarbon liquid should therefore be chosen such that it is possible to achieve such a final aniline point at the desired weight solids content of the film-forming material. For example, it would be impractical to use xylene (aniline point, −17° C) as the first hydrocarbon liquid because the attainment of the desired final aniline point for the hydrocarbon liquid mixture would require the addition of large quantities of hydrocarbon liquids of high aniline point and the final material would be far too dilute to be useful. The choice of first hydrocarbon liquid with an aniline point lying within our specified range makes easy the achievement of both desired weight solids content and required final aniline point of the hydrocarbon liquid mixture.

The second hydrocarbon liquid which is added as a diluent in the final stages of our process will usually possess a higher aniline point than the first hydrocarbon liquid as the aniline point rises from the permitted 35° – 45° C range of the first hydrocarbon liquid to the permitted 40° – 50° C range of the mixture. It should, of course, be chosen such that it gives a final aniline point within the permitted final aniline point range at the desired weight solids content. It is possible and permissible to use the same hydrocarbon liquid for both first and second hydrocarbon liquids provided that all the abovementioned criteria are met.

We have found that for both first and second hydrocarbon liquids it is especially convenient to use commercially-available petroleum fractions which are mixtures of aliphatic and aromatic hydrocarbons, either alone or mixed with other organic liquids. Examples of the use of such products are the use of "Shell" EC282 solvent ("Shell" is a registered trade mark) or "Shell" EC528 solvent mixed with a portion of xylene as the first hydrocarbon liquid, and "Shell" EC282 solvent or "Shell" EC528 solvent, a medium boiling hydrocarbon of low aromatic content (17% ASTM D-1319) boiling point range 128° –155° C. as the respective second hydrocarbon liquid.

A drying or semi-drying oil-modified alkyd resin basically comprises the condensation product of a polyhydric alcohol and a polybasic acid to which are attached, e.g. by ester-linkages, mono-carboxylic fatty acid chains usually comprising about 18 carbon atoms and derived from long chain aliphatic carboxylic acids or more usually from triglyceride oils. The monocarboxylic fatty acid chains utilised in the alkyd resin used in the working of our invention are derived from, for example, tall, safflower, soya, linseed and sunflower oils.

For the best working of our invention, we have found that the alkyd resin should have an oil length of 60% - 70%. The components and proportions of these components of the condensation product to which the monocarboxylic fatty acid chains are attached are not critical with the exception that for the purposes of this invention the polybasic acid must comprise itaconic acid to the extent of 1 - 4% of the weight of the drying oil-modified alkyd resin. When reacting $\alpha$, $\beta$-ethylenically unsaturated monomers with drying or semi-drying oil-modified alkyd resins, the art has hitherto been content to let the monomers graft on to ethylenic unsaturation of the monocarboxylic fatty acids chains in a random fashion, and it is a special feature of our invention that the polymerisation conditions have been selected such that substantially all of the monomers should be attached to the alkyd resin via the pendant ethylenic double bonds of the itaconic acid.

The copolymerisable $\alpha$, $\beta$-ethylenically unsaturated monomers which are added to the alkyd resin solution and then reacted with the alkyd resin may be chosen from the wide range of such monomers commercially available subject to the restriction that one of the monomers must be acrylonitrile present to the extent of 10 - 19% by weight of the total weight of the monomers. Monomers which may be used in the working of our invention include styrene, the mixed isomers of methyl styrene known as "vinyl toluene" and acrylic and methacrylic acids and their alkyl esters e.g. methyl methacrylate, ethyl acrylate and hydroxypropyl methacrylate. These monomers are reacted with the alkyd resin by heating the mixture in the presence of a polymerisation initiator which is not a peroxide or a hydroperoxide. Peroxides and hydroperoxides permit reaction of the monocarboxylic fatty acid chains with each other and this leads to an undesirable increase in the viscosity of the reaction product. We therefore use non-peroxide and non-hydro peroxide polymerisation initiators such as azo-bis-isobutyronitrile and its derivatives.

The polymerisation reaction may be carried out at 100° - 135° but we have found that above 120° C, the half-life of the initiator is very short and further frequent additions of initiator are required. We therefore prefer to work below 110° C where the initiator half-life is acceptably long; this relatively low temperature has the additional advantage that it makes the cooling stage easier.

It is an important part of our invention that the final film-forming material should comprise a stable dispersion of polymer particles of maximum size 2 micron. The nature of these particles is not fully known to us but we have found that enamels comprising a film-forming material which comprises such a stable dispersion is markedly superior to an enamel comprising a simple solution of a similar film-forming material. The stable dispersion is generated when the reaction mixture is diluted with the second hydrocarbon liquid and cooled rapidly. We have discovered that in order to produce a dispersion of small particle size (below 2 micron), the initial cooling must be very rapid — the temperature must be cooled from the reaction temperature to 80° C in less than 30 minutes. The initial rapid cooling is achieved with the help of the addition of the second hydrocarbon liquid to bring the final aniline point of the mixture to 40° - 50° C. The cooling of the mixture is timed from the addition of the second hydrocarbon liquid and rapid forced cooling is continued until the mixture is below 60° C. The resulting product is a film-forming material comprising a stable dispersion of particles of maximum size 2 micron which can be directly incorporated into a paint composition with excellent properties and unusually fast drying.

The invention is further illustrated by the following examples in which all parts are expressed by weight.

EXAMPLE 1

Preparation of a suitable semi-drying oil-modified alkyd with an itaconic acid content of 2% by weight and an oil length of 64% and the preparation therefrom of a film-forming material according to the invention.

(a) Preparation of the alkyd

The following ingredients were charged to a vessel equipped with a reflux condenser and a Dean and Stark water separator.

| | |
|---|---|
| tall oil fatty acids | 45.17 parts |
| glycerol | 0.84 parts |
| itaconic acid | 1.46 parts |
| pentaerythritol | 13.14 parts |
| phthalic anhydride | 11.36 parts |
| xylene | 1.74 parts |

The contents of the vessel were heated to reflux and water removed. The reflux was continued until the acid value of the mixture fell to within 6–9 mgm KOH/gm. The resulting alkyd resin was then diluted with 26.29 parts of xylene. The alkyd resin thus prepared had a Gardner-Holdt viscosity of H-K at 72.0% ± 1.0% solids.

(b) Preparation of a film-forming material

The ingredients used in the various stages of the preparation were as follows.

| Stage A | Alkyd resin (from above) | 43.600 parts |
|---|---|---|
| | Hydrocarbon liquid* | 20.700 parts |
| | Xylene | 3.610 parts |
| Stage B | Styrene | 14.950 parts |
| | Butyl acrylate | 5.620 parts |
| | Methyl methacrylate | 1.520 parts |
| | Acrylonitrile | 3.310 parts |
| | Azo bis-isobutyronitrile | 0.166 parts |
| Stage C | Hydrocarbon liquid* | 1.960 parts |
| | Azo bis-isobutyronitrile | 0.270 parts |
| Stage D | Hydrocarbon liquid* | 24.310 parts |

*"Shell" EC528 solvent, a commercially available petroleum fraction comprising aromatic and aliphatic hydrocarbons, was used.

The preparation was conducted as follows:

A The Stage A ingredients were charged to a vessel equipped with a reflux condenser heated to reflux and held at 107° C.

B The monomers were initially mixed and the azo bis-isobutyronitrile initiator dissolved therein. The mixture was then drip-fed into the stage A alkyd solution over a period of 2 hours.

C The liquid was added followed by the azo bisisobutyronitrile; the initiator was added in nine portions of 0.03 parts each at the rate of one every 15 minutes.

D Reflux was continued for a further hour at 107° C. The heating was then stopped and the hydrocarbon liquid added to give an aniline point of 46° C. The mixture was cooled such that its temperature was below 80° C within 30 minutes of the solvent addition. Rapid forced cooling was continued until the temperature of the mixture was below 60° C.

The resulting film-forming material comprised a stable dispersion of particles of particle size approximately 1 micron, and had a solids content of 43% by weight and a Gardner-Holdt viscosity of W-¼.

EXAMPLE 2

Preparation of a typical fast air-drying enamel from a film-forming material prepared by the process according to the invention and comparison with a commercially-available fast drying enamel.

The following materials were sand ground together until a dispersion of particle size 5 micron maximum (as measured on a Hegmann gauge) was achieved.

| | |
|---|---|
| Film-forming material (from Example 1) | 14.60 parts |
| Iron oxide pigment | 5.91 parts |
| High boiling hydrocarbon solvent* (96–99% aromatics by volume) | 4.21 parts |
| Medium boiling aliphatic hydrocarbon solvent+ (5–12% aromatics by volume) | 3.70 parts |

*A commercial material called "Solvesso" 150 (registered trade mark) was used.
+A commercial material called "Shell" EC282 (registered trade mark) was used.

The mixture was filtered and the following materials were then stirred in.

| | |
|---|---|
| Film-forming material (from Example 1) | 50.00 parts |
| Medium boiling aliphatic hydrocarbon solvent (5–12% aromatics by volume) | 7.38 parts |

The resultant enamel was sprayed on to a primed automobile panel by a skilled tradesman until adequate coverage was achieved and the panel allowed to air dry. A commercially-available fast drying automotive enamel was applied to a similar primed automobile panel by the same tradesman and the two were examined. Although the objective difference in the gloss levels of the two panels was small, it was immediately apparent that the panel sprayed with the enamel comprising a film-forming material prepared by a process according to the present invention had a much "fuller", deeper gloss than the panel sprayed with the commercially-available enamel.

EXAMPLE 3

Substitution in Example 1 of a drying oil fatty acid and a different mixture of monomers.

Example 1 was repeated except that in the preparation of the alkyd, 45.17 parts of soya bean oil fatty acids were substituted for the 45.17 parts of tall oil fatty acids, and the Stage B materials used in the preparation of the film-forming material were replaced by the following materials.

| | |
|---|---|
| Styrene | 16.45 parts |
| Butyl acrylate | 2.86 parts |
| Methyl methacrylate | 4.95 parts |
| Acrylonitrile | 3.64 parts |
| Azo bis-isobutyronitrile | 0.166 parts |

The materials and details of the preparation were otherwise identical to those of Example 1.

The final film-forming material comprised a stable dispersion of particles of particle size approximately 1 micron, and had a solids content of 43% by weight and a Gardner-Holdt viscosity of Y. This film-forming material was processed into an enamel according to the method of Example 2 and when sprayed on to a primed automobile panel as described in that example, it exhibited the same excellent gloss characteristics.

EXAMPLE 4

Demonstration of the effect of using a solvent of incorrect aniline point.

Example 1 was repeated using xylene as the only solvent, an equal weight of xylene being substituted for the hydrocarbon liquid of stages C and D. The final film-forming material was a solution and had a solids content of 43% and a Gardner-Holdt viscosity of X-Y. When processed into an enamel which was then coated on to an automotive panel according to the methods of Example 2, the final coating film exhibited considerably poorer gloss than that of the coating film obtained from the enamel of Example 1 or that of Example 3.

EXAMPLE 5

Demonstration of the effect of exceeding the specified limits of the itaconic acid content of the alkyd resin.

Two film-forming materials were prepared according to the method and using the quantities of Example 1 except that in one preparation, no itaconic acid was used and in the other 8% of the weight of the alkyd resin of itaconic acid was used. The final film-forming material from the former preparation comprised a two phase system of addition polymer and alkyd and that from the latter had a Gardner-Holdt viscosity of Z6. Neither of these materials were suitable for use in an enamel.

EXAMPLE 6

Demonstration of the unsuitability of a peroxide initiator for one on the process according to the invention.

A film-forming material was prepared according to Example 1 except that the azo bisisobutyronitrile was substituted by an equal quantity of benzoyl peroxide. The final film-forming material had a solids content of 44% and a Gardner-Holdt viscosity of Z6, which made it unsuitable for use in an enamel.

EXAMPLE 7

Demonstration of the effect of extending the time of the cooling stage beyond the specified time. Example 1 was repeated except that in Stage D of the preparation of the film-forming material, no forced cooling was used and, after the final addition of hydrocarbon liquid, the mixture was allowed to cool overnight. The resultant film-forming material which comprised polymer particles of diameter 3–5 micron was processed into a coating composition which was then coated on to an automotive panel according to the methods of Example 2. The gloss of the coating film thus obtained was markedly inferior to that of the coating film comprising the film-forming material of Example 1 or that of Example 3.

We claim:
1. A process of preparing a liquid film-forming dispersion with particles of 2 microns maximum size by the stages of:
  (a) adding a mixture of at least two copolymerisable α, β-ethylenically unsaturated monomers at least 10–19% by weight of which mixture is acrylonitrile, to a solution of a 60–70% oil length drying or semi-drying oil modified alkyd resin comprising 1.0 – 4.0% by weight of itaconic acid in a first hydrocarbon liquid of aniline point 35° – 45° C, at a con- centration such that monomer mixture comprises 35 – 55% of the total weight of the monomers and alkyd resin, and then reacting the monomers with the alkyd resin at 100°– 135° C in the presence of a free radical polymerisation initiator which is not a peroxide or a hydroperoxide;

at the completion of the reaction, diluting the reaction mixture with a second hydrocarbon liquid until the final aniline point of the resulting hydrocarbon liquid mixture in which the reaction product is dissolved is 40°–50° C; and then (c) cooling the mixture at such a rate that there is formed a stable dispersion of polymer particles of size 2 micron maximum.

2. A process according to claim 1 wherein the monomers are reacted with the alkyd resin at a temperature of 100° – 110° C.

3. An enamel comprising a liquid film-forming dispersion with particles of 2 microns maximum size which is the reaction product of (a) adding a mixture of at least two copolymerisable α, β-ethylenically unsaturated monomers at least 10–19% by weight of which mixture is acrylonitrile, to a solution of a 60–70% oil length drying or semi-drying oil modified alkyd resin comprising 1.0 – 4.0% by weight of itaconic acid in a first hydrocarbon liquid of aniline point 35° – 45° at a concentration such that the monomer mixture comprises 35 – 55% of the total weight of the monomers and alkyd resin, and then reacting the monomers with the alkyd resin at 100° – 135° C in the presence of a free radical polymerisation initiator which is not a peroxide or a hydroperoxide; and (b) at the completion of reaction, diluting the reaction mixture with a second hydrocarbon liquid until the final aniline point of the resulting hydrocarbon liquid mixture in which the reaction product is dissolved is 40° – 50° C; and then (c) cooling the mixture at such a rate that there is formed a stable dispersion of polymer particles of size 2 micron maximum.

* * * * *